(12) United States Patent
Miyamoto et al.

(10) Patent No.: US 7,023,112 B2
(45) Date of Patent: Apr. 4, 2006

(54) VIBRATING DEVICE FOR AXIALLY VIBRATING A MOVABLE MEMBER

(75) Inventors: Kazumi Miyamoto, Yamanashi-ken (JP); Kenshi Aihara, Yamanashi-ken (JP); Naoki Miura, Yamanashi-ken (JP)

(73) Assignee: Citizen Electronics Co., Ltd., Yamanashi-ken (JP)

( * ) Notice: Subject to any disclaimer, the term of this patent is extended or adjusted under 35 U.S.C. 154(b) by 0 days.

(21) Appl. No.: 10/339,352

(22) Filed: Jan. 10, 2003

(65) Prior Publication Data

US 2003/0142845 A1  Jul. 31, 2003

(30) Foreign Application Priority Data

Jan. 29, 2002 (JP) ............................. 2002-020793

(51) Int. Cl.
*H02K 41/00* (2006.01)

(52) U.S. Cl. .................................................... 310/12

(58) Field of Classification Search .......... 310/12–14, 310/15, 17
See application file for complete search history.

(56) References Cited

U.S. PATENT DOCUMENTS

| | | | | |
|---|---|---|---|---|
| 3,671,829 A | * | 6/1972 | Mathews | 318/128 |
| 3,707,924 A | * | 1/1973 | Barthalon et al. | 104/290 |
| RE32,285 E | * | 11/1986 | Farmer et al. | 360/266.5 |
| 5,121,016 A | * | 6/1992 | Wachi | 310/14 |
| 5,471,100 A | * | 11/1995 | Sakamoto et al. | 310/12 |
| 5,980,211 A | * | 11/1999 | Tojo et al. | 417/45 |

FOREIGN PATENT DOCUMENTS

JP    7 107699    4/1995

* cited by examiner

*Primary Examiner*—Karl Tamai
*Assistant Examiner*—Judson H. Jones
(74) *Attorney, Agent, or Firm*—Dennison, Schultz, Dougherty & MacDonald

(57) ABSTRACT

A vibrating device has an axially elongated frame, and a vibrating assembly including a hollow yoke. A magnetic driving device is provided for axially vibrating the vibrating assembly. A supporting shaft is provided for axially slidably supporting the vibrating assembly in the frame.

5 Claims, 4 Drawing Sheets

VIBRATING DEVICE FOR AXIALLY VIBRATING A MOVABLE MEMBER

BACKGROUND OF THE INVENTION

The present invention relates to a vibrating device having an axially driven movable member, and more particularly to a vibrating device mounted in a portable telephone for signaling a user by vibration of the movable member.

In recent years, there is popularized various portable instruments such as portable telephone, PDA (Personal Digital Assistant), wearable computing instruments and so forth. In these instruments, vibrating devices are mounted for informing signals, by vibration without producing sounds.

FIG. 7 is a perspective view showing a conventional vibration device disclosed in Japanese Patent Laid Open 7-107699. A direct current motor 131 has a rotating shaft 136 supported by a bearing 133. There is formed an annular groove 135 on which an eccentric weight 134 is secured by a fixer 140.

In such a motor, since a commutator and a brush assembly are provided, manufacturing cost increases. It takes a time before the rotating speed approaches 7000~8000 rpm. Therefore, the device is improper to a device which vibrates in accordance with a music signal. Furthermore, arcs generated between the commutator and brushes cause the quality and the life of the motor to reduce.

The applicant of this patent application has proposed a vibrating device which may remove disadvantages of the prior art.

FIG. 5 is a sectional side view of the vibrating device, FIG. 6 is a sectional view taken along a line VI—VI of FIG. 5.

The vibrating device 210 comprises a cylindrical frame 211 made of a resin, a vibrating assembly 220 axially movably mounted in the frame 211, and a magnetic driving device 219 mounted in the frame 211 at an end thereof.

The vibrating assembly 220 comprises a cup-shaped yoke 221 having a bottom 221b, a cylindrical permanent magnet 222 secured to the yoke 221 at the axis thereof, and a pair of weights 223a and 223b secured to the outside and inside of the bottom 221b of the yoke 221. The yoke 221 is slidably supported by three projections 214 formed on the inside wall of the frame 211, so that the vibrating assembly 220 can be smoothly vibrated.

The vibrating assembly 220 is resiliently held at a neutral position by a pair of coil springs 224 and 225 provided between both axial ends and the frame 211.

The magnetic driving device 219 comprises a coil bobbin 213 cantilevered in the end of the frame 211 and a driving coil 212 provided on the coil bobbin 213. The coil bobbin 213 is made of a metal pipe, on the peripheral surface of which is formed an insulation layer. The coil bobbin 213 is inserted in a space 226 between the yoke 221 and the permanent magnet 222.

The primary resonance frequency of the vibrating assembly 220 is 100–160 Hz, the vibration at which is properly transmitted to the user's body. An alternating signal having a basic frequency of the primary resonance frequency is applied to the driving coil 212 from terminals 235 and 236, so that the vibrating assembly 220 is axially vibrated.

However, large friction generates between the outside wall of the vibrating assembly 220 and the inside wall of the frame 211, because of a large sliding area there-between. The large friction causes the efficiency of the device to reduce.

SUMMARY OF THE INVENTION

An object of the present invention is to provide a vibrating device in which the friction is reduced, thereby improving the efficiency of the device.

According to the present invention, there is provided a vibrating device comprising an axially elongated frame, a vibrating assembly including a hollow yoke having an opening at an end thereof, and a permanent magnet secured to the yoke, a magnetic driving device including a coil bobbin cantilevered in the frame and having an end portion inserted in the yoke from the opening, a driving coil mounted on the coil bobbin, at least one spring provided for resiliently holding the vibrating assembly in the frame, characterized in that at least one supporting shaft is provided for axially slidably supporting the vibrating assembly in the frame.

In an aspect of the present invention, the supporting shaft is axially slidably mounted in the frame, and the vibrating assembly is secured to the supporting shaft.

In another aspect, the supporting shaft is secured to the frame, and the vibrating assembly is slidably mounted on the supporting shaft.

In further aspect, the supporting shaft comprises a pair of shafts, the shafts are secured to axial both ends of the vibrating assembly, and slidably mounted in the frame.

The fixed supporting shaft has a small diameter portion at a central portion of the shaft.

These and other objects and features of the present invention will become more apparent from the following detailed description with reference to the accompanying drawings.

DETAILED DESCRIPTION OF THE PREFERRED EMBODIMENT

Figure 1:
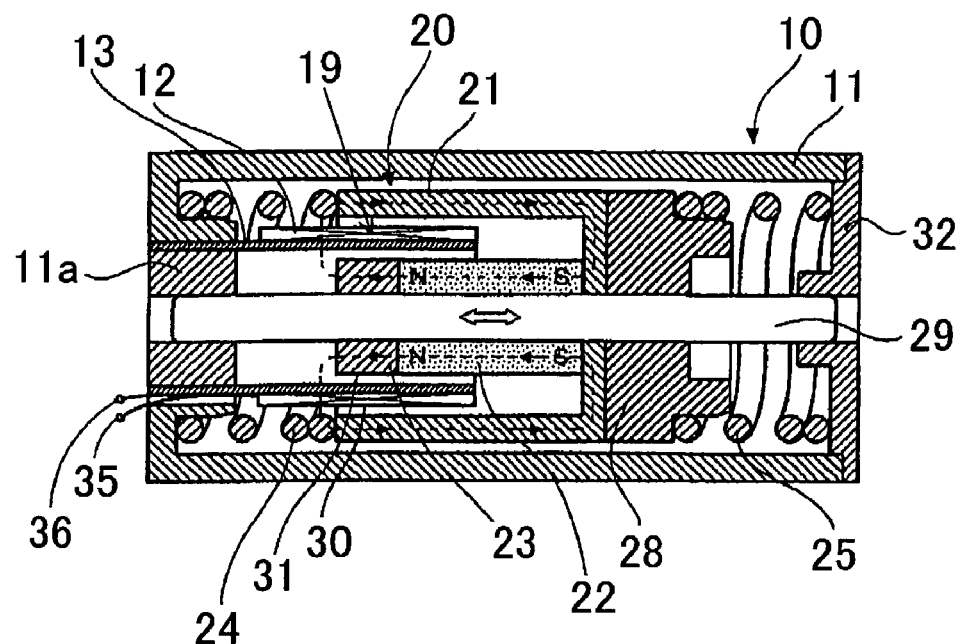
FIG. 1 is a sectional side view showing a first embodiment of the present invention.

FIG. 1 is a sectional side view showing a first embodiment of the present invention.

A vibrating device 10 of the present invention comprises a cylindrical frame 11 made of a resin, a supporting shaft 29 axially movably mounted in the frame 11, a vibrating assembly 20 secured to the shaft 29, and a magnetic driving device 19 mounted in the frame 11.

The vibrating assembly 20 comprises a cup-shaped yoke 21 secured to the shaft 29, a cylindrical permanent magnet 22 and a cylindrical pole piece 23 secured to the shaft 29, and a weight 28 secured to the outside of the bottom of the yoke 21.

The vibrating assembly 20 is resiliently held at a neutral position by a pair of coil springs 24 and 25 provided between both axial ends and the frame 11.

The magnetic driving device 19 comprises a coil bobbin 13 cantilevered in the end of the frame 11 and a driving coil 12 provided on the coil bobbin 13. The coil bobbin 13 is made of a metal pipe, on the peripheral surface of which is formed an insulation layer. There is formed spaces 30 and 31 between the yoke 21 and the permanent magnet 22. The shaft 29 is slidably supported by a supporting member 11a secured to the coil bobbin 13 and a supporting member 32 secured to the frame 11.

The primary resonance frequency of the vibrating assembly 20 is 100–160 Hz, the vibration at which is properly transmitted to the user's body. An alternating signal having a basic frequency of the primary resonance frequency is applied to the driving coil 12 from terminals 35 and 36, so that the vibrating assembly 20 is axially vibrated.

Figure 4:
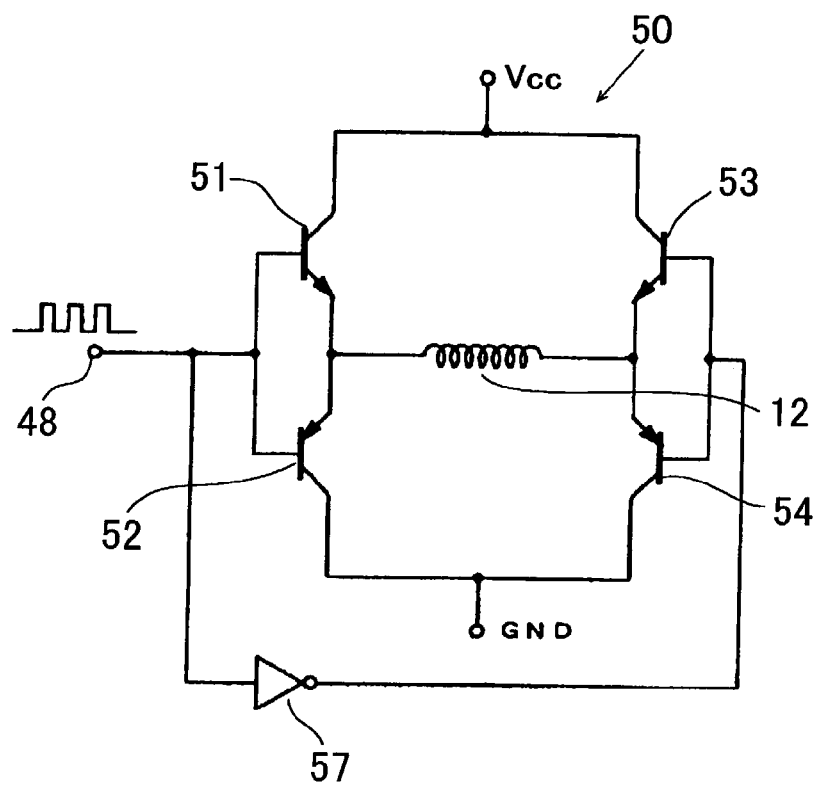
FIG. 4 is a driving circuit for driving the vibrating device.

FIG. 4 is a driving circuit for driving the vibrating device.

In operation, when a low frequency signal of about 100–300 Hz is applied to an input terminal 48 of the driving circuit 50, the transistors 51 and 54 are turned on at a high level of the input signal. Consequently, a current passes the driving coil 12 through the transistors 51 and 54 from the Vcc to GND. And the current passes through the transistor 53, coil 12 and transistor 52 at a low level of the input signal. Thus, an alternating current of the low frequency corresponding to the input low frequency signal flows in the coil 12. Consequently, the vibrating assembly 20 is axially vibrated together with the shaft 29.

Figure 5:
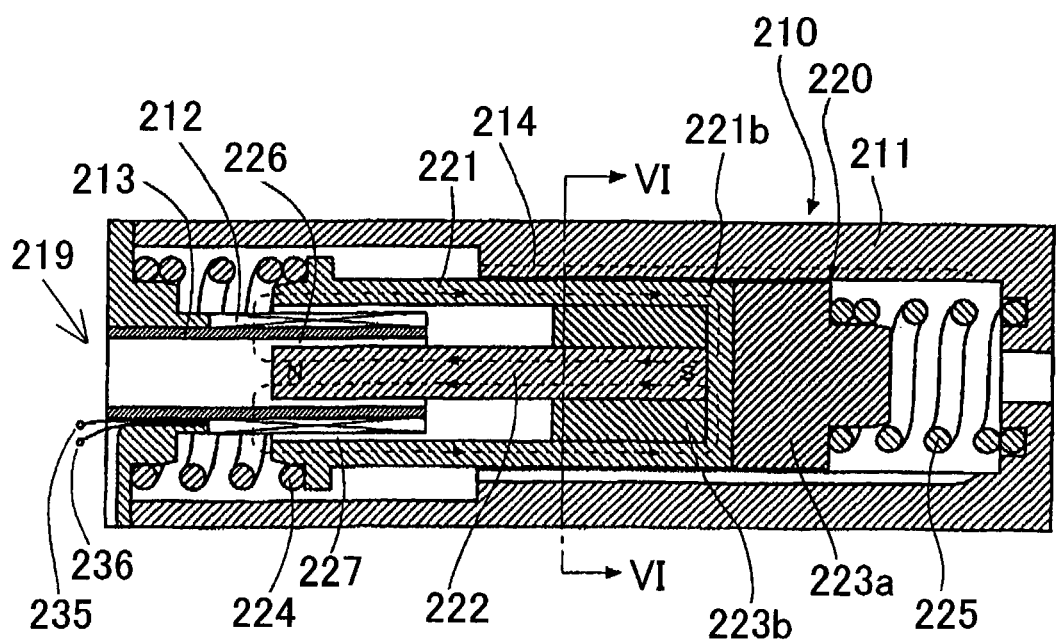
FIG. 5 is a sectional side view of the vibrating device.
Figure 6:
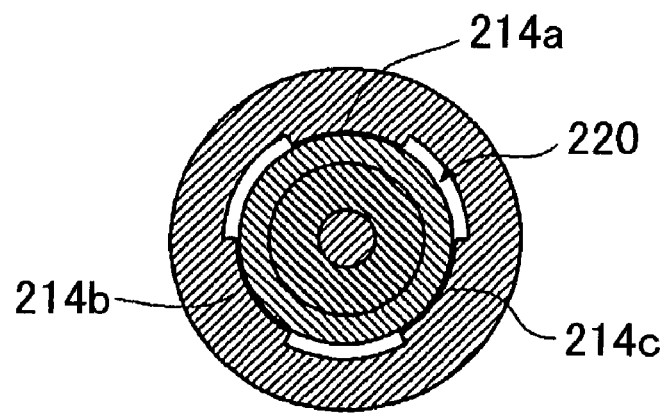
FIG. 6 is a sectional view taken along a line VI—VI of FIG. 5.
Figure 7:
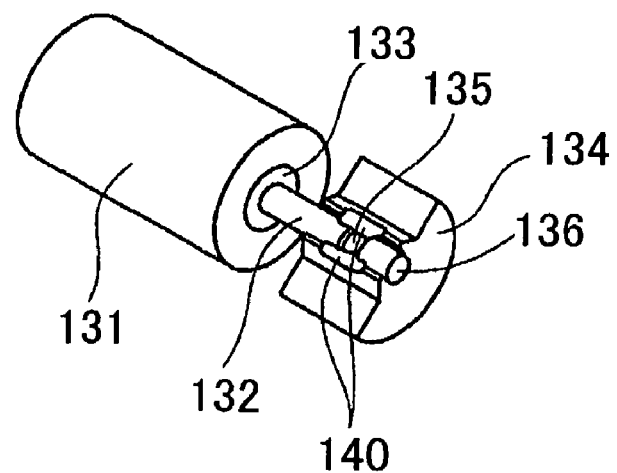
FIG. 7 is a perspective view showing a conventional vibration device.

The sliding area between the shaft 29 and the supporting members 11a and 32 is small. Therefore, the friction therebetween is very small compared with that of the conventional device of FIG. 5.

Figure 2:
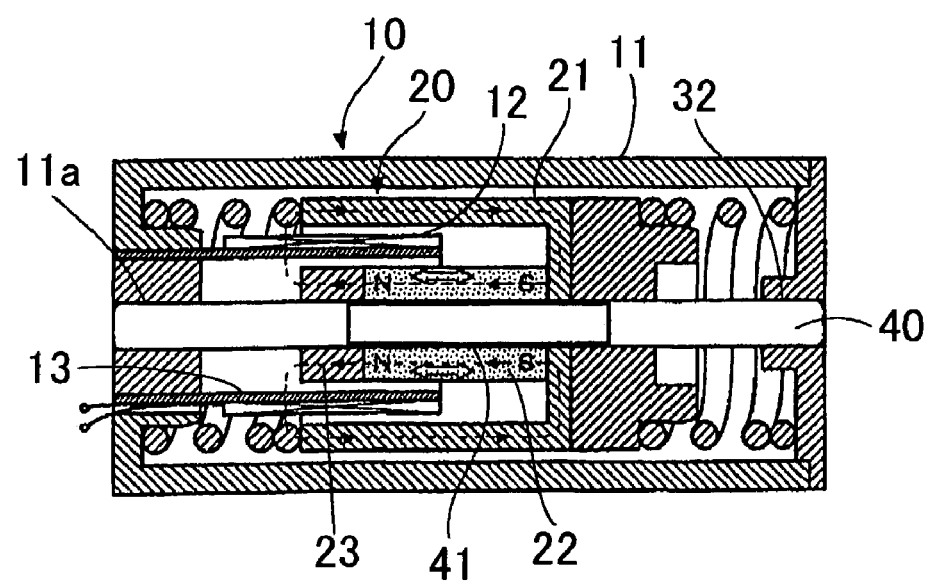
FIG. 2 is a sectional side view of a second embodiment of the present invention.

FIG. 2 is a sectional side view of a second embodiment of the present invention.

In the device, a shaft 40 is secured to the supporting members 11a and 32. The yoke 21, permanent magnet 22, pole piece 23 and weight 28 are fixed with each other and slidably mounted on the shaft 40. There is formed a small diameter portion 41 at a central portion of the shaft 40 so that the sliding area between the vibrating assembly 20 and the shaft 40 is reduced. Other parts are the same as the device of FIG. 1 and identified by the same reference numerals.

The vibrating assembly 20 is vibrated along the shaft 40.

Figure 3:
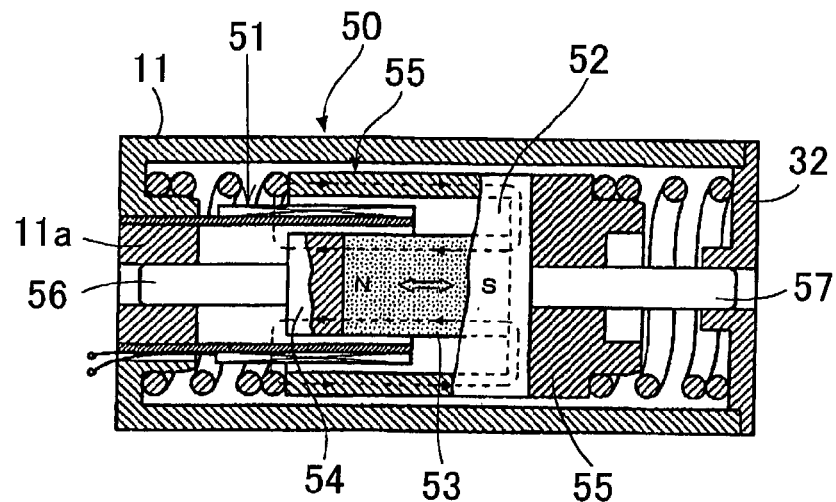
FIG. 3 is a sectional side view showing a third embodiment of the present invention.

FIG. 3 is a sectional side view showing a third embodiment of the present invention.

A vibrating device 50 of the third embodiment comprises, a vibrating assembly 55, and a magnetic driving device 51 mounted in the frame 11.

The vibrating assembly 55 comprises a cup-shaped yoke 52, a cylindrical solid permanent magnet 53 secured to the bottom of yoke 52, a cylindrical solid pole piece 54 secured to the permanent magnet 53, and a weight 55 secured to the outside of the bottom of the yoke 52. There is a provided a pair of supporting shafts 56 and 57. The supporting shaft 56 is secured to the pole piece 54 and slidably supported by the supporting member 11a. The supporting shaft 57 is secured to the yoke 52 and slidably supported by the supporting member 32.

Other parts are the same as the first embodiment.

The vibrating assembly 55 vibrates together with the supporting shafts 56 and 57.

While the invention has been described in conjunction with preferred specific embodiment thereof, it will be understood that this description is intended to illustrate and not limit the scope of the invention, which is defined by the following claims.

What is claimed is:

1. A vibrating device comprising:
   an axially elongated frame;
   a vibrating assembly including a hollow yoke having an opening at an end thereof, a weight secured to the yoke, and a permanent magnet secured to the yoke;
   a magnetic driving device including a coil bobbin cantilevered in the frame and having an end portion inserted in the yoke from the opening, a driving coil mounted on the coil bobbin;
   a pair of springs provided respectively at both ends of the vibrating assembly inside walls of the frame for resiliently holding the vibrating assembly in the frame; and
   at least one supporting shaft axially movably mounted in the frame to be engaged with at least one axial hole of the vibrating assembly so as to axially slidably support the vibrating assembly in the frame.

2. The device according to claim 1 wherein the supporting shaft is axially slidably mounted in the frame, and the vibrating assembly is secured to the supporting shaft.

3. The device according to claim 1 wherein the supporting shaft is secured to the frame, and the vibrating assembly slidably mounted on the supporting shaft.

4. The device according to claim 1 wherein the supporting shaft comprises a pair of shafts, the shafts are secured to axial both ends of the vibrating assembly, and slidably mounted in the frame.

5. The device according to claim 3 wherein the supporting shaft has a small diameter portion at a central portion of the shaft.

* * * * *